US012777031B2

(12) United States Patent
Liu et al.

(10) Patent No.: US 12,777,031 B2
(45) Date of Patent: Oct. 27, 2026

(54) METHODS AND APPARATUSES FOR ACQUIRING USER IDENTIFIER REGISTERD IN CLIENT BY USER BASED ON USER INFORMATION, DEVICES AND MEDIA

(71) Applicant: BOE Technology Group Co., Ltd., Beijing (CN)

(72) Inventors: Qingbing Liu, Beijing (CN); Guoqiang Zhang, Beijing (CN); Jianxun Liu, Beijing (CN); Hongliang Wang, Beijing (CN); Xinxin Liu, Beijing (CN); Endi Huang, Beijing (CN)

(73) Assignee: Beijing BOE Technology Development Co., Ltd., Beijing (CN)

( * ) Notice: Subject to any disclaimer, the term of this patent is extended or adjusted under 35 U.S.C. 154(b) by 254 days.

(21) Appl. No.: 18/681,493

(22) PCT Filed: Nov. 2, 2022

(86) PCT No.: PCT/CN2022/129317
§ 371 (c)(1),
(2) Date: Feb. 5, 2024

(87) PCT Pub. No.: WO2024/092565
PCT Pub. Date: May 10, 2024

(65) Prior Publication Data
US 2025/0133074 A1 Apr. 24, 2025

(51) Int. Cl.
*H04L 9/40* (2022.01)

(52) U.S. Cl.
CPC .......... *H04L 63/083* (2013.01); *H04L 63/062* (2013.01)

(58) Field of Classification Search
CPC ....... H04L 63/083; H04L 63/062; H04W 8/26
(Continued)

(56) References Cited

U.S. PATENT DOCUMENTS

2005/0125668 A1* 6/2005 Botz .................. G06Q 20/3829 713/171
2021/0165871 A1* 6/2021 Jensen ................ G06F 21/6218
2021/0377257 A1 12/2021 Asher et al.

FOREIGN PATENT DOCUMENTS

CN 109885351 A 6/2019
CN 110414207 A 11/2019
(Continued)

OTHER PUBLICATIONS

PCT/CN2022/129317 international search report dated Mar. 20, 2023.
PCT/CN2022/129317 Written Opinion dated Mar. 20, 2023.

*Primary Examiner* — Bryan F Wright
(74) *Attorney, Agent, or Firm* — IPro, PLLC

(57) ABSTRACT

Identifier acquisition methods and apparatuses, devices and media are provided. When an identity token carried in an identity authentication request from a master application client is authenticated, an application management terminal transmits a first user identifier registered in the master application client by a target user corresponding to user information carried in the identity authentication request to the master application client. The master application client transmits the first user identifier and the identity token to a micro application client, so that the micro application client transmits an identifier acquisition request carrying the first user identifier and the identity token to the application management terminal. When the identity token in the identifier acquisition request is authenticated, the application management terminal acquires a second user identifier corresponding to the first user identifier in the micro application client, and transmits the second user identifier to the micro application client.

20 Claims, 7 Drawing Sheets

(58) Field of Classification Search
USPC .............................................................. 726/4
See application file for complete search history.

(56) References Cited

FOREIGN PATENT DOCUMENTS

| | | | |
|---|---|---|---|
| CN | 113591059 | A | 11/2021 |
| CN | 113703946 | A | 11/2021 |
| CN | 114338212 | A | 4/2022 |

* cited by examiner

METHODS AND APPARATUSES FOR ACQUIRING USER IDENTIFIER REGISTERD IN CLIENT BY USER BASED ON USER INFORMATION, DEVICES AND MEDIA

CROSS-REFERENCE TO RELATED APPLICATIONS

This application is a national stage of international PCT Application No. PCT/CN2022/129317 filed on Nov. 2, 2022, the entire contents of which are incorporated herein by reference.

TECHNICAL FIELD

The present disclosure relates to the field of computer technology, and in particular, to identifier acquisition methods and apparatuses, devices and media.

BACKGROUND

Micro front-end, as a technical means capable of aggregating multiple independent applications together and providing a unified access portal to access the multiple applications, is increasingly widely used in the process of software development. An application that provides a unified access portal may be called a master application, and each independent application that is aggregated in the master application may serve as a slave application.

In related art, data between a master application and a slave application, as well as between slave applications, are isolated from each other and cannot be shared, making it impossible to perform comprehensive data analysis on the data of the master application and the slave application.

SUMMARY

The present disclosure provides identifier acquisition methods and apparatuses, devices and media to solve deficiencies in related art.

According to a first aspect of the embodiments of the present disclosure, there is provided an identifier acquisition method. The method is executed by an application management terminal, and includes:

- in response to receiving an identity authentication request from a master application client and an identity token carried in the identity authentication request being authenticated, transmitting a first user identifier corresponding to user information carried in the identity authentication request to the master application client, where the first user identifier indicates a user identifier registered in the master application client by a target user corresponding to the user information, the master application client is configured to transmit the first user identifier and the identity token to a micro application client in response to receiving the first user identifier, and the micro application client is configured to transmit an identifier acquisition request to the application management terminal based on the first user identifier and the identity token;
- in response to receiving the identifier acquisition request from the micro application client and the identity token carried in the identifier acquisition request being authenticated, acquiring a second user identifier corresponding to the first user identifier carried in the identifier acquisition request, where the second user identifier indicates a user identifier registered in the micro application client by the target user;
- transmitting the second user identifier to the micro application client.

In the present disclosure, when receiving the identity authentication request from the master application client, in a case where the identity token carried in the identity authentication request is successfully authenticated, the application management terminal transmits the first user identifier registered in the master application client by the target user corresponding to the user information carried in the identity authentication request to the master application client. In response to receiving the first user identifier, the master application client is configured to transmit the first user identifier and the identity token to the micro application client. The micro application client may transmit the identifier acquisition request carrying the first user identifier and the identity token to the application management terminal. In response to receiving the identifier acquisition request, in a case where the identity token is successfully authenticated, the application management terminal acquires the second user identifier corresponding to the first user identifier in the micro application client, and transmits the second user identifier to the micro application client. Thus, user systems of a master application and a micro application are connected, and the master application and the micro application can share data based on the connected user systems.

In some embodiments, the identity token includes at least signature information;

- in response to receiving the identity authentication request from the master application client and the identity token carried in the identity authentication request being authenticated, transmitting the first user identifier corresponding to the user information carried in the identity authentication request to the master application client includes:
- in response to receiving the identity authentication request from the master application client, authenticating the identity token based on the signature information in the identity token;
- in response to determining that the signature information is authenticated, acquiring the first user identifier based on the user information carried in the identity authentication request;
- transmitting the first user identifier to the master application client.

In some embodiments, before, in response to receiving the identity authentication request from the master application client and the identity token carried in the identity authentication request being authenticated, transmitting the first user identifier corresponding to the user information carried in the identity authentication request to the master application client, the method further includes:

- in response to receiving an application registration request from the master application client, generating a master application identifier and a master application secret key for the master application client, and transmitting the master application identifier and the master application secret key to the master application client; or
- in response to receiving an application registration request from the micro application client, generating a micro application identifier and a micro application secret key for the micro application client, and transmitting the micro application identifier and the micro application secret key to the micro application client; or both.

In some embodiments, before, in response to receiving the identity authentication request from the master application client and the identity token carried in the identity authentication request being authenticated, transmitting the first user identifier corresponding to the user information carried in the identity authentication request to the master application client, the method further includes:

in response to receiving a first application authentication request from the master application client, authenticating legality of the master application client based on the master application identifier and the master application secret key carried in the first application authentication request;

in response to determining that the legality of the master application client is authenticated, transmitting the identity token to the master application client, and in response to determining that the legality of the master application client is not authenticated, transmitting prompt information to the master application client, where the prompt information is configured to prompt that the legality of the master application client is not authenticated.

In some embodiments, after, in response to determining that the legality of the master application client is authenticated, transmitting the identity token to the master application client, the method further includes:

in response to receiving a second application authentication request from the micro application client, authenticating permission for the master application client to use the micro application client based on the micro application identifier, the micro application secret key, the master application identifier, and the identity token carried in the second application authentication request;

in response to determining that the master application client has the permission to use the micro application client, transmitting information indicating that the use is allowed to the micro application client, and in response to determining that the master application client does not have the permission to use the micro application client, transmitting information indicating that the use is prohibited to the micro application client.

In some embodiments, before, in response to receiving the second application authentication request from the micro application client, authenticating the permission for the master application client to use the micro application client based on the micro application identifier, the micro application secret key, the master application identifier, and the identity token carried in the second application authentication request, the method further includes:

in response to receiving a permission acquisition request from the master application client, setting permission information for the master application client to have the permission to use the micro application client.

According to a second aspect of the embodiments of the present disclosure, there is provided an identifier acquisition method. The method is executed by a master application client, and includes:

transmitting an identity authentication request to an application management terminal, where the identity authentication request carries an identity token and user information, the application management terminal is configured to acquire a first user identifier corresponding to the user information in response to determining that the identity token is authenticated, and the first user identifier indicates a user identifier registered in the master application client by a target user corresponding to the user information;

in response to receiving the first user identifier, transmitting the first user identifier to a micro application client, where the micro application client is configured to transmit an identifier acquisition request carrying the identity token and the first user identifier to the application management terminal in response to receiving the first user identifier, and the identifier acquisition request is configured to acquire a user identifier registered in the micro application client by the target user.

In the present disclosure, the master application client transmits the identity authentication request carrying the identity token and the user information to the application management terminal. In response to determining that the identity token is successfully authenticated, the application management terminal acquires the first user identifier registered in the master application client by the target user corresponding to the user information, and returns the first user identifier to the master application client. In response to receiving the first user identifier, the master application client may transmit the first user identifier and the identity token to the micro application client. In response to receiving the first user identifier, the micro application client transmits the identifier acquisition request carrying the identity token and the first user identifier to the application management terminal, so as to acquire the user identifier registered in the micro application client by the target user from the identifier acquisition request. Thus, user systems of a master application and a micro application are connected, and the master application and the micro application can share data based on the connected user systems.

In some embodiments, before transmitting the identity authentication request to the application management terminal, the method further includes:

transmitting an application registration request to the application management terminal, where the application management terminal is configured to generate a master application identifier and a master application secret key for the master application client in response to the application registration request;

receiving the master application identifier and the master application secret key returned from the application management terminal.

In some embodiments, before transmitting the identity authentication request to the application management terminal, the method further includes:

transmitting a first application authentication request to the application management terminal, where the first application authentication request carries a master application identifier and a master application secret key, and the application management terminal is configured to authenticate legality of the master application client based on the master application identifier and the master application secret key, and transmit the identity token to the master application client in response to determining that the legality of the master application client is authenticated.

In some embodiments, after transmitting the first application authentication request to the application management terminal, the method further includes:

in response to receiving the identity token, transmitting the master application identifier and the identity token to the micro application client, where the micro application client is configured to transmit a second application authentication request carrying a micro application identifier, a micro application secret key, the master application identifier, and the identity token to the application management terminal, and the application management terminal is configured to authenticate permission for the master application client to use the micro application client based on the micro application identifier, the micro application secret key, the master application identifier, and the identity token, and return an authentication result to the micro application client.

In some embodiments, before transmitting the identity authentication request to the application management terminal, the method further includes:

transmitting a permission acquisition request to the application management terminal, where the application management terminal is configured to set permission information for the master application client to have permission to use the micro application client in response to the permission acquisition request.

According to a third aspect of the embodiments of the present disclosure, there is provided an identifier acquisition method. The method is executed by a micro application client, and includes:

receiving a first user identifier transmitted from a master application client, where the first user identifier indicates a user identifier registered in the master application client by a target user;

transmitting an identifier acquisition request carrying an identity token and the first user identifier to an application management terminal, where the identifier acquisition request is configured to acquire a second user identifier registered in the micro application client by the target user;

receiving the second user identifier transmitted from the application management terminal.

In the present disclosure, the micro application client receives the first user identifier registered in the master application client by the target user from the master application client, and transmits the identifier acquisition request carrying the identity token and the first user identifier to the application management terminal, so as to acquire the second user identifier registered in the micro application client by the target user from the identifier acquisition request. Thus, user systems of a master application and a micro application are connected, and the master application and the micro application can share data based on the connected user systems.

In some embodiments, before receiving the first user identifier transmitted from the master application client, the method further includes:

transmitting an application registration request to the application management terminal, where the application management terminal is configured to generate a micro application identifier and a micro application secret key for the micro application client in response to the application registration request;

receiving the micro application identifier and the micro application secret key returned from the application management terminal.

In some embodiments, before receiving the first user identifier transmitted from the master application client, the method further includes:

in response to receiving a master application identifier and the identity token from the master application client, transmitting a second application authentication request to the application management terminal, where the second application authentication request carries the micro application identifier, the micro application secret key, the master application identifier, and the identity token, and the application management terminal is configured to authenticate permission for the master application client to use the micro application client based on the micro application identifier, the micro application secret key, the master application identifier, and the identity token, and return an authentication result to the micro application client.

According to a fourth aspect of the embodiments of the present disclosure, there is provided an identifier acquisition apparatus. The apparatus is applied to an application management terminal, and includes:

a transmission module, configured to, in response to receiving an identity authentication request from a master application client and an identity token carried in the identity authentication request being authenticated, transmit a first user identifier corresponding to user information carried in the identity authentication request to the master application client, where the first user identifier indicates a user identifier registered in the master application client by a target user corresponding to the user information, the master application client is configured to transmit the first user identifier and the identity token to a micro application client in response to receiving the first user identifier, and the micro application client is configured to transmit an identifier acquisition request to the application management terminal based on the first user identifier and the identity token;

an acquisition module, configured to, in response to receiving the identifier acquisition request from the micro application client and the identity token carried in the identifier acquisition request being authenticated, acquire a second user identifier corresponding to the first user identifier carried in the identifier acquisition request, where the second user identifier indicates a user identifier registered in the micro application client by the target user;

where the transmission module is further configured to transmit the second user identifier to the micro application client.

In some embodiments, the identity token includes at least signature information;

when, in response to receiving the identity authentication request from the master application client and the identity token carried in the identity authentication request being authenticated, transmitting the first user identifier corresponding to the user information carried in the identity authentication request to the master application client, the transmission module is configured to:

in response to receiving the identity authentication request from the master application client, authenticate the identity token based on the signature information in the identity token;

in response to determining that the signature information is authenticated, acquire the first user identifier based on the user information carried in the identity authentication request;

transmit the first user identifier to the master application client.

In some embodiments, the apparatus further includes:

a generation module, configured to, in response to receiving an application registration request from the master application client, generate a master application identifier and a master application secret key for the master application client, where the generation module is further configured to, in response to receiving an application registration request from the micro application client, generate a micro application identifier and a micro application secret key for the micro application client.

In some embodiments, the apparatus further includes:

an authentication module, configured to, in response to receiving a first application authentication request from the master application client, authenticate legality of the master application client based on the master application identifier and the master application secret key carried in the first application authentication request;

the transmission module is further configured to, in response to determining that the legality of the master application client is authenticated, transmit the identity token to the master application client, and in response to determining that the legality of the master application client is not authenticated, transmit prompt information to the master application client, where the prompt information is configured to prompt that the legality of the master application client is not authenticated.

In some embodiments, the authentication module is further configured to, in response to receiving a second application authentication request from the micro application client, authenticate permission for the master application client to use the micro application client based on the micro application identifier, the micro application secret key, the master application identifier, and the identity token carried in the second application authentication request;

the transmission module is further configured to, in response to determining that the master application client has the permission to use the micro application client, transmit information indicating that the use is allowed to the micro application client, and in response to determining that the master application client does not have the permission to use the micro application client, transmit information indicating that the use is prohibited to the micro application client.

In some embodiments, the apparatus further includes:

a setting module, configured to, in response to receiving a permission acquisition request from the master application client, set permission information for the master application client to have the permission to use the micro application client.

According to a fifth aspect of the embodiments of the present disclosure, there is provided an identifier acquisition apparatus. The apparatus is applied to a master application client, and includes:

a transmission module, configured to transmit an identity authentication request to an application management terminal, where the identity authentication request carries an identity token and user information, the application management terminal is configured to acquire a first user identifier corresponding to the user information in response to determining that the identity token is authenticated, and the first user identifier indicates a user identifier registered in the master application client by a target user corresponding to the user information;

where the transmission module is further configured to, in response to receiving the first user identifier, transmit the first user identifier to a micro application client, where the micro application client is configured to transmit an identifier acquisition request carrying the identity token and the first user identifier to the application management terminal in response to receiving the first user identifier, and the identifier acquisition request is configured to acquire a user identifier registered in the micro application client by the target user.

In some embodiments, the transmission module is further configured to transmit an application registration request to the application management terminal, where the application management terminal is configured to generate a master application identifier and a master application secret key for the master application client in response to the application registration request;

the apparatus further includes:

a reception module, configured to receive the master application identifier and the master application secret key returned from the application management terminal.

In some embodiments, the transmission module is further configured to transmit a first application authentication request to the application management terminal, where the first application authentication request carries a master application identifier and a master application secret key, and the application management terminal is configured to authenticate legality of the master application client based on the master application identifier and the master application secret key, and transmit the identity token to the master application client in response to determining that the legality of the master application client is authenticated.

In some embodiments, the transmission module is further configured to, in response to receiving the identity token, transmit the master application identifier and the identity token to the micro application client, where the micro application client is configured to transmit a second application authentication request carrying a micro application identifier, a micro application secret key, the master application identifier, and the identity token to the application management terminal, and the application management terminal is configured to authenticate permission for the master application client to use the micro application client based on the micro application identifier, the micro application secret key, the master application identifier, and the identity token, and return an authentication result to the micro application client.

In some embodiments, the transmission module is further configured to transmit a permission acquisition request to the application management terminal, where the application management terminal is configured to set permission information for the master application client to have permission to use the micro application client in response to the permission acquisition request.

According to a sixth aspect of the embodiments of the present disclosure, there is provided an identifier acquisition apparatus. The apparatus is applied to a micro application client, and includes:

a reception module, configured to receive a first user identifier transmitted from a master application client, where the first user identifier indicates a user identifier registered in the master application client by a target user corresponding to user information;

a transmission module, configured to transmit an identifier acquisition request carrying an identity token and the first user identifier to an application management terminal, where the identifier acquisition request is configured to acquire a second user identifier registered in the micro application client by the target user;

where the reception module is further configured to receive the second user identifier transmitted from the application management terminal.

In some embodiments, the transmission module is further configured to transmit an application registration request to the application management terminal, where the application management terminal is configured to generate a micro application identifier and a micro application secret key for the micro application client in response to the application registration request;

the reception module is further configured to receive the micro application identifier and the micro application secret key returned from the application management terminal.

In some embodiments, the transmission module is further configured to, in response to receiving a master application identifier and the identity token from the master application client, transmit a second application authentication request to the application management terminal, where the second application authentication request carries the micro application identifier, the micro application secret key, the master application identifier, and the identity token, and the application management terminal is configured to authenticate permission for the master application client to use the micro application client based on the micro application identifier, the micro application secret key, the master application identifier, and the identity token, and return an authentication result to the micro application client.

According to a seventh aspect of the embodiments of the present disclosure, there is provided a computing device. The computing device includes: a memory, a processor, and a computer program stored in the memory and runnable on the processor, where the program is executed by the processor to implement the identifier acquisition method according to the first aspect and any one of the embodiments in the first aspect.

According to an eighth aspect of the embodiments of the present disclosure, there is provided a computing device. The computing device includes: a memory, a processor, and a computer program stored in the memory and runnable on the processor, where the program is executed by the processor to implement the identifier acquisition method according to the second aspect and any one of the embodiments in the second aspect.

According to a ninth aspect of the embodiments of the present disclosure, there is provided a computing device. The computing device includes: a memory, a processor, and a computer program stored in the memory and runnable on the processor, where the program is executed by the processor to implement the identifier acquisition method according to the third aspect and any one of the embodiments in the third aspect.

According to a tenth aspect of the embodiments of the present disclosure, there is provided a computer readable storage medium having a program stored thereon, where the program is executed by a processor to implement the identifier acquisition method according to the first aspect and any one of the embodiments in the first aspect.

According to an eleventh aspect of the embodiments of the present disclosure, there is provided a computer readable storage medium having a program stored thereon, where the program is executed by a processor to implement the identifier acquisition method according to the second aspect and any one of the embodiments in the second aspect.

According to a twelfth aspect of the embodiments of the present disclosure, there is provided a computer readable storage medium having a program stored thereon, where the program is executed by a processor to implement the identifier acquisition method according to the third aspect and any one of the embodiments in the third aspect.

It should be understood that the above general description and the following detailed description are only exemplary and explanatory and are not restrictive of the present disclosure.

BRIEF DESCRIPTION OF DRAWINGS

The accompanying drawings, which are incorporated in and constitute a part of this specification, illustrate examples consistent with the present disclosure and, together with the description, serve to explain the principle of the disclosure.

DETAILED DESCRIPTION

Figure 1:
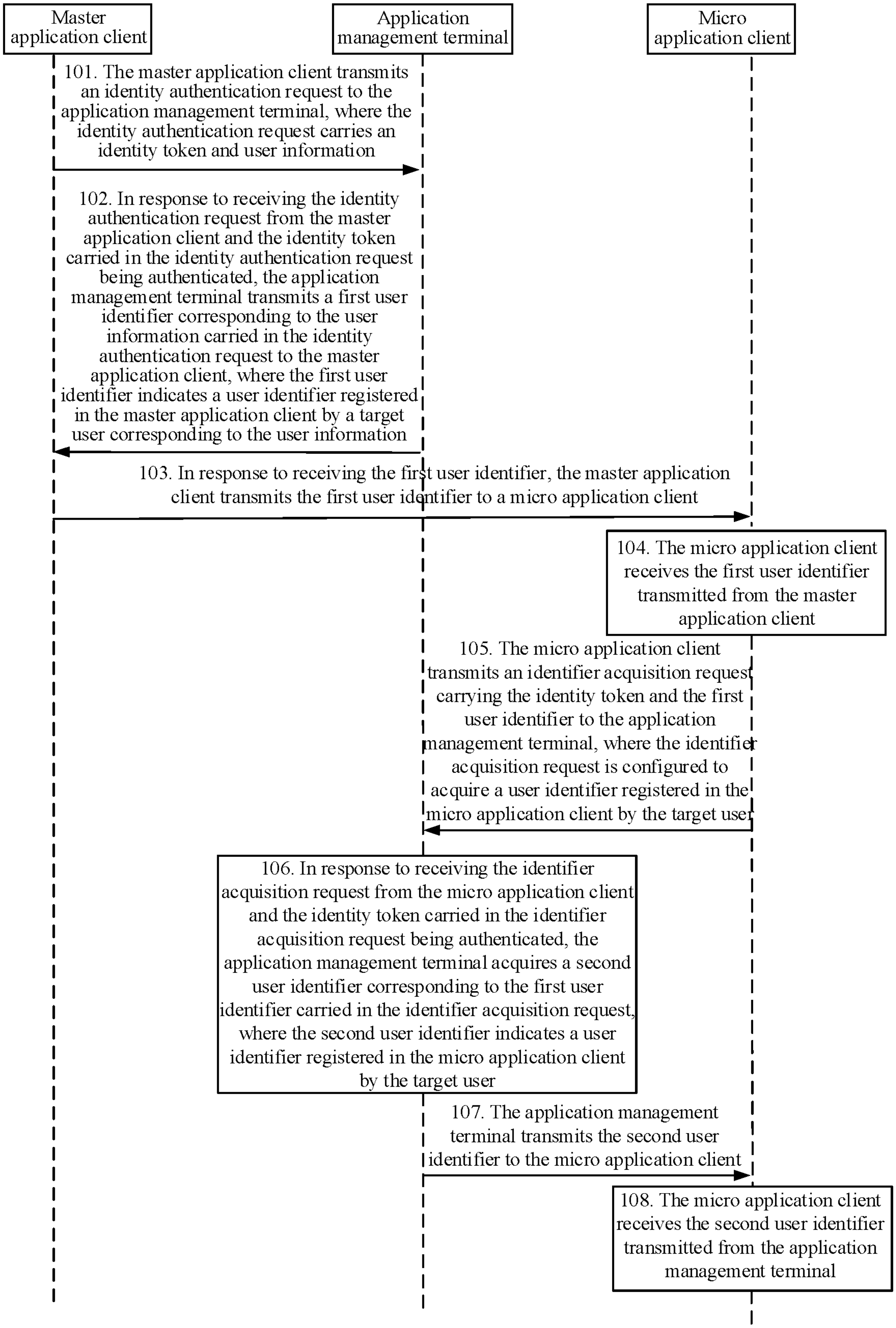
FIG. 1 is a flowchart illustrating an identifier acquisition method according to an embodiment of the present disclosure.

Examples will be described in detail herein, with the illustrations thereof represented in the drawings. When the following descriptions involve the drawings, like numerals in different drawings refer to like or similar elements unless otherwise indicated. The embodiments described in the following examples do not represent all embodiments consistent with the present disclosure. Rather, they are merely examples of apparatuses and methods consistent with some aspects of the present disclosure as detailed in the appended claims.

The present disclosure provides an identifier acquisition method for acquiring a first user identifier registered in a master application client by a corresponding target user and a second user identifier registered in a micro application client by the target user based on user information, so that user systems of a master application and a micro application are connected, and the master application and the micro application can share data based on the connected user systems.

The master application may be any type of application, for example, an instant messaging application, a multimedia data processing application, or a shopping application. The micro application may be any type of customized application based on Web/mobile terminal. The micro application does not need to be downloaded from an application store. The micro application is directly embedded in the master application, so that the micro application is invoked through the master application, and services provided by the micro application can be used.

Taking the master application being an instant messaging application as an example, the micro application may be a game application, a medical service application, a government and enterprise information query application, or other application embedded in the instant messaging application. The types of the master application and the micro application are not limited in the present disclosure.

After the application scenarios of the present disclosure are introduced, the identifier acquisition method provided in the present disclosure will be described in detail below.

FIG. 1 is a flowchart illustrating an identifier acquisition method according to an embodiment of the present disclosure. As shown in FIG. 1, the method includes the following steps.

At step 101, a master application client transmits an identity authentication request to an application management terminal, where the identity authentication request carries an identity token and user information.

The user information may include a user name, a user identity card number, contact information, etc. The specific contents included in the user information are not limited in the present disclosure, and it needs to be ensured only that the user information is information authorized by the user.

At step 102, in response to receiving the identity authentication request from the master application client and the identity token carried in the identity authentication request being authenticated, the application management terminal transmits a first user identifier corresponding to the user information carried in the identity authentication request to the master application client, where the first user identifier indicates a user identifier registered in the master application client by a target user corresponding to the user information.

At step 103, in response to receiving the first user identifier, the master application client transmits the first user identifier to a micro application client.

At step 104, the micro application client receives the first user identifier transmitted from the master application client.

At step 105, the micro application client transmits an identifier acquisition request carrying the identity token and the first user identifier to the application management terminal, where the identifier acquisition request is configured to acquire a user identifier registered in the micro application client by the target user.

At step 106, in response to receiving the identifier acquisition request from the micro application client and the identity token carried in the identifier acquisition request being authenticated, the application management terminal acquires a second user identifier corresponding to the first user identifier carried in the identifier acquisition request, where the second user identifier indicates a user identifier registered in the micro application client by the target user.

At step 107, the application management terminal transmits the second user identifier to the micro application client.

At step 108, the micro application client receives the second user identifier transmitted from the application management terminal.

In the present disclosure, the master application client transmits the identity authentication request carrying the identity token and the user information to the application management terminal. In response to determining that the identity token is successfully authenticated, the application management terminal acquires the first user identifier registered in the master application client by the target user corresponding to the user information, and then returns the first user identifier to the master application client. In response to receiving the first user identifier, the master application client is configured to transmit the first user identifier and the identity token to the micro application client; and the micro application client can transmit an identifier acquisition request carrying the first user identifier and the identity token to the application management terminal. In response to receiving the identifier acquisition request from the micro application client, in a case where the identity token is successfully authenticated, the application management terminal acquires the second user identifier corresponding to the first user identifier in the micro application client, and transmits the second user identifier to the micro application client. The micro application client can acquire the second user identifier registered in the micro application client by the target user. Thus, user systems of a master application and a micro application are connected, and the master application and the micro application can share data based on the connected user systems.

After the basic implementation process of the identifier acquisition method in the present disclosure is introduced, optional embodiments of the present disclosure will be described below.

It should be noted that, to achieve the connection between the user systems of the master application and the micro application through the solutions provided in steps 101 to 107, the master application and the micro application need to be pre-registered on the application management terminal, and the application management terminal performs initialization authentication on the master application and the micro application. In a case where the authentication is successful, the connection between the user systems of the master application and the micro application can be achieved through steps 101 to 107.

Firstly, processes of registering the master application client and the micro application client on the application management terminal will be introduced.

For the process of registering the master application client, the master application client may transmit an application registration request to the application management terminal, and the application management terminal may receive the application registration request transmitted from the master application client. In response to receiving the application registration request from the master application client, the application management terminal generates a master application identifier and a master application secret key for the master application client, and transmits the master application identifier (or called master appid) and the master application secret key (or called master appSerect) to the master application client. The master application client receives the master application identifier and the master application secret key returned from the application management terminal, so that the registration of the master application client on the application management terminal can be achieved.

For the process of registering the micro application client, the micro application client may transmit an application registration request to the application management terminal, and the application management terminal may receive the application registration request transmitted from the micro application client. In response to receiving the application registration request from the micro application client, the application management terminal generates a micro application identifier (or called micro appid) and a micro application secret key (or called micro appSerect) for the micro application client, and transmits the micro application identifier and the micro application secret key to the micro application client. The micro application client receives the micro application identifier and the micro application secret key returned from the application management terminal, so that the registration of the micro application client on the application management terminal can be achieved.

It should be noted that both the master application identifier and the micro application identifier can be generated based on Java native 32-bit Universally Unique Identifier (UUID).

In a possible implementation manner, 32-bit UUID may be randomly generated. Since UUID is generally hexadecimal, UUID may be divided into 8 groups, with every 4 characters forming one group. Then, modulo 62 operation is performed, and its result is indexed to extract characters, so that 8 characters are obtained, and the 8 characters may be used as an application identifier.

The above description is only an illustrative method for generating an application identifier. In some other embodiments, the application identifier may be generated by using other methods, which are not limited in the present disclosure.

Furthermore, it should be noted that both the master application secret key and the micro application secret key can be generated based on an application identifier and UUID by using a secret key generation algorithm. For example, an application secret key may be generated based on an application identifier and UUID by using a Secure Hash Algorithm 1 (SHA-1). In some embodiments, the application secret key may be generated by using other algorithms, which are not limited in the present disclosure.

The above description is only an illustrative method for generating an application secret key. In some other embodiments, the application secret key may be generated by using other methods, which are not limited in the present disclosure.

It should be noted that, after generating the master application identifier and the master application secret key for the master application client, the application management terminal may store the generated master application identifier and master application secret key, so that the legality of the master application client may be successfully authenticated subsequently based on the stored master application identifier and master application secret key. And, after generating the micro application identifier and the micro application secret key for the micro application client, the application management terminal may store the generated micro application identifier and micro application secret key, so that the legality of the micro application client may be successfully authenticated subsequently based on the stored micro application identifier and micro application secret key.

In addition, after being registered on the application management terminal, the master application client may apply for permission to use the micro application client on the application management terminal.

In some embodiments, the master application client transmits a permission acquisition request to the application management terminal. In response to receiving the permission acquisition request from the master application client, the application management terminal sets permission information for the master application client to have the permission to use the micro application client.

In a possible implementation manner, the application management terminal may store the application identifier of the micro application client and the application identifier of the master application client having the permission to use the micro application client in the corresponding manner, so that the permission information for the master application client can be set to have the permission to use the micro application client.

It should be noted that the application management terminal may include a micro application management platform and a master index platform. The processes of generating the application identifiers and the application secret keys for the master application client and the micro application client, as well as the process of assigning the permission for the master application client to use the micro application client, may be executed by the micro application management platform.

Figure 2:
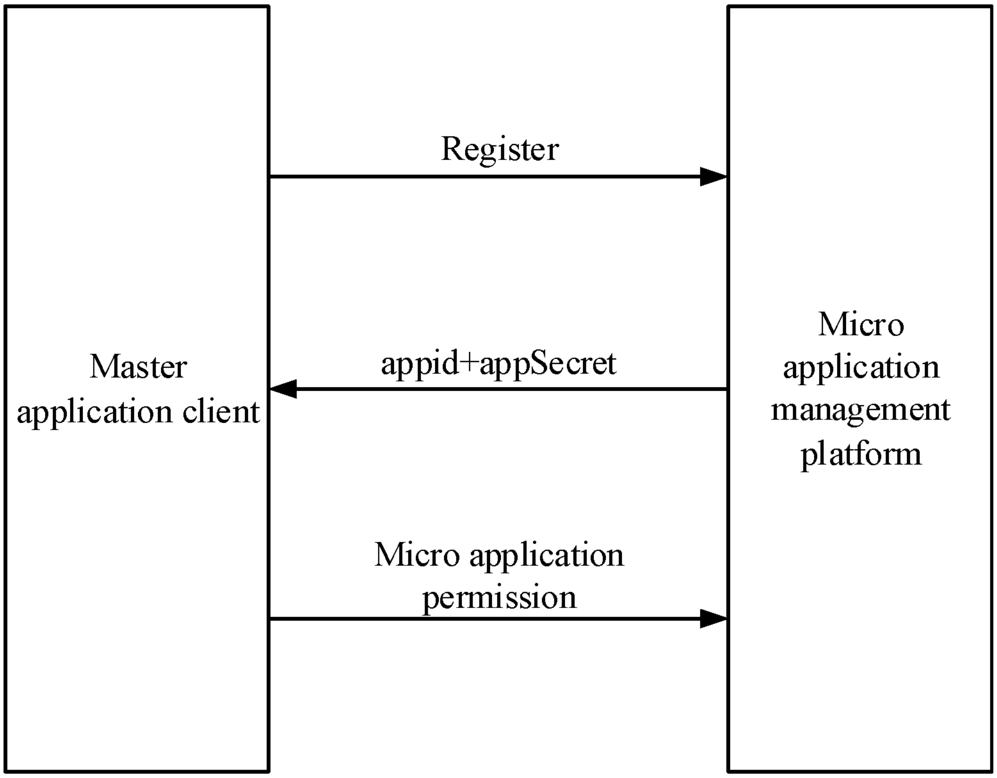
FIG. 2 is a flowchart illustrating a process of registering a master application client according to an embodiment of the present disclosure.

FIG. 2 is a flowchart illustrating a process of registering a master application client according to an embodiment of the present disclosure. As shown in FIG. 2, the master application client applies for registration on the micro application management platform, and the micro application management platform generates the master appid and the master appSecret for the master application client and returns the master appid and the master appSecret to the master application client. In addition, the master application client may apply for the permission to use the micro application client on the micro application management platform.

Figure 3:
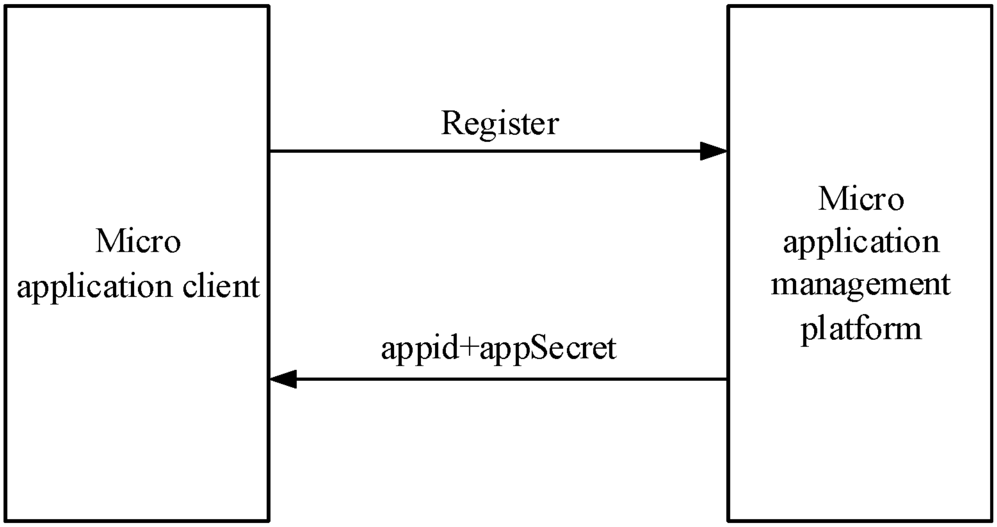
FIG. 3 is a flowchart illustrating a process of registering a micro application client according to an embodiment of the present disclosure.

FIG. 3 is a flowchart illustrating a process of registering a micro application client according to an embodiment of the present disclosure. As shown in FIG. 3, the micro application client applies for registration on the micro application management platform, and the micro application management platform generates the micro appid and the micro appSecret for the micro application client and returns the micro appid and the micro appSecret to the micro application client.

After completing the registration and the permission assignment of the master application client, and the registration of the micro application client, the application management terminal may perform initialization authentication on the master application client and the micro application client, so as to authenticate the legality of the master application client and the micro application client.

Processes of performing initialization authentication on the master application client and the micro application client on the application management terminal will be introduced below.

For the process of performing initialization authentication on the master application client on the application management terminal, the master application client transmits a first application authentication request carrying the master application identifier and the master application secret key to the application management terminal. And in response to receiving the first application authentication request from the master application client, the application management terminal authenticates the legality of the master application client based on the master application identifier and the master application secret key carried in the first application authentication request. In a case where the legality of the master application client is successfully authenticated, the application management terminal transmits the identity token to the master application client, and otherwise, transmits prompt information (for example, error code) to the master application client, where the prompt information is configured to prompt that the legality of the master application client is not authenticated.

In a possible implementation manner, the application management terminal may compare the master application identifier and the master application secret key carried in the first application authentication request with the stored master application identifier and master application secret key. If the master application identifier and the master application secret key carried in the first application authentication request exist in the stored master application identifier and master application secret key, it may be determined that the legality of the master application client is successfully authenticated.

It should be noted that, in a case where the legality of the master application client is successfully authenticated, the application management terminal may generate the identity token for the master application client, and return the generated identity token to the master application client.

In some embodiments, the identity token may be generated by using Java Web Token (JWT). Furthermore, the identity token may be generated by using other methods, which are not limited in the present disclosure.

The identity token may include an expiration time, user information, a master application identifier, and signature information. In some embodiments, the identity token may further include more or less contents, which are not limited in the present disclosure.

It should be noted that, after generating the identity token for the master application client, the application management terminal may store the generated identity token, so that the legality of the micro application client may be successfully authenticated subsequently based on the stored identity token.

For the process of performing initialization authentication on the micro application client on the application management terminal, it needs to be implemented in a case where the legality of the master application client is successfully authenticated.

In response to receiving the identity token, the master application client transmits the master application identifier and the identity token to the micro application client. In response to receiving the master application identifier and the identity token from the master application client, the micro application client transmits a second application authentication request carrying the micro application identifier, the micro application secret key, the master application identifier, and the identity token to the application management terminal. In response to receiving the second application authentication request from the micro application client, the application management terminal authenticates permission for the master application client to use the micro application client based on the micro application identifier, the micro application secret key, the master application identifier, and the identity token carried in the second application authentication request. And in response to determining that the master application client has the permission to use the micro application client, the application management terminal transmits information indicating that the use is allowed to the micro application client, and otherwise, transmits information indicating that the use is prohibited to the micro application client.

It should be noted that, when transmitting the master application identifier and the identity token to the micro application client, the master application client may transmit the master application identifier and the identity token to a Software Development Kit (SDK) of the micro application client. The SDK of the micro application client transmits the second application authentication request to the application management terminal.

In a possible implementation manner, after receiving the second application authentication request, the application management terminal may compare the micro application identifier, the micro application secret key, and the master application identifier carried in the second application authentication request with the stored micro application identifier, micro application secret key, and master application identifier, and authenticate the identity token based on the signature information included in the identity token. If the micro application identifier, the micro application secret key, and the master application identifier carried in the second application authentication request exist in the stored micro application identifier, micro application secret key, and master application identifier, and the signature information is successfully authenticated, it may be determined that the legality of the micro application client is successfully authenticated.

It should be noted that the processes of performing initialization authentication on the master application client and the micro application client may be implemented by the micro application management platform.

Figure 4:
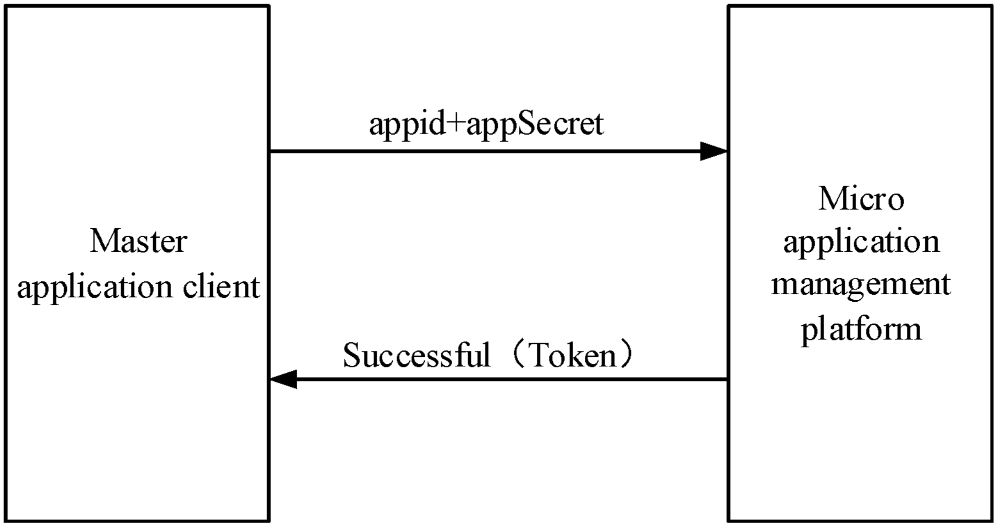
FIG. 4 is a flowchart illustrating a process of performing initialization authentication on a master application client according to an embodiment of the present disclosure.

FIG. 4 is a flowchart illustrating a process of performing initialization authentication on a master application client according to an embodiment of the present disclosure. As shown in FIG. 4, the master application client may transmit the first application authentication request carrying the master appid and the master appSecret to the micro application management platform. In a case where the master appid and the master appSecret are successfully authenticated (i.e., authentication is successful), the micro application management platform may return the identity token (i.e., Token) to the master application client.

Figure 5:
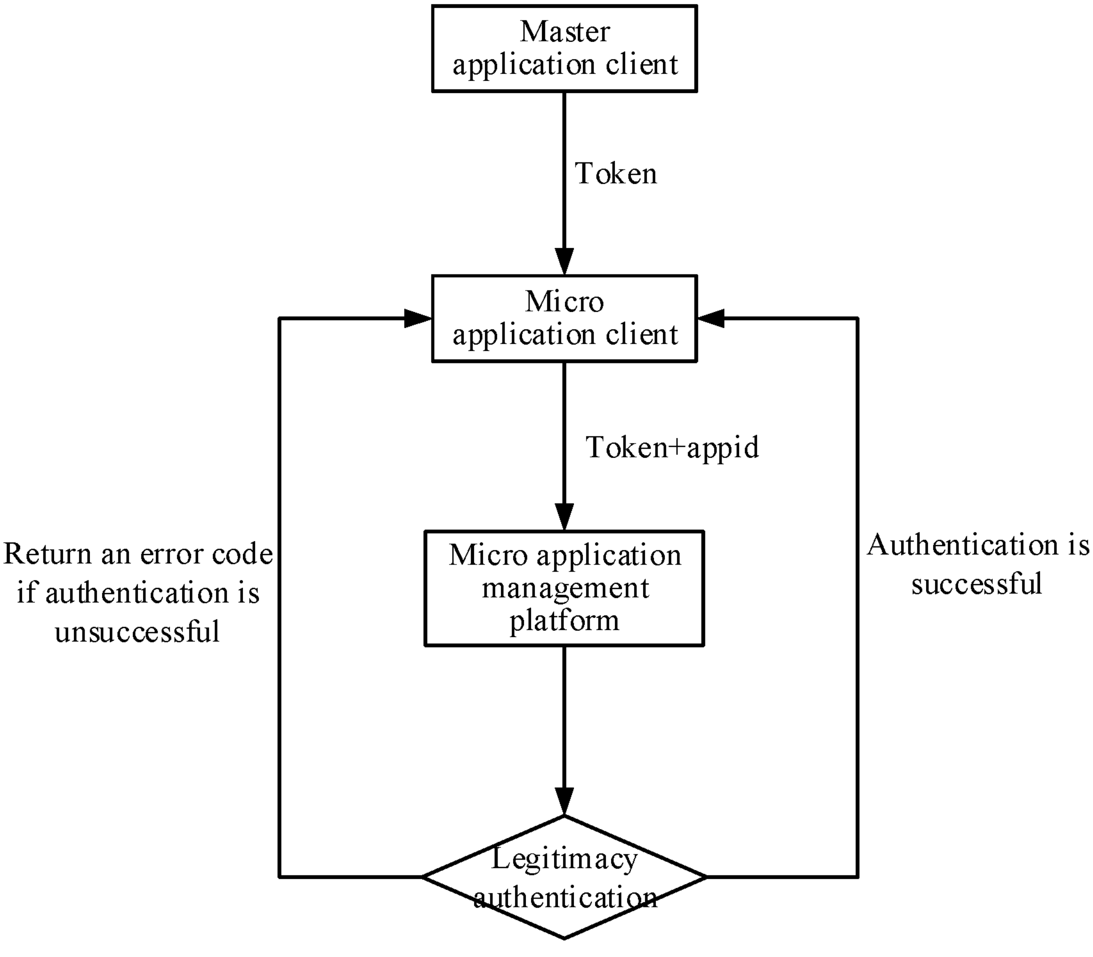
FIG. 5 is a flowchart illustrating a process of performing initialization authentication on a micro application client according to an embodiment of the present disclosure.

FIG. 5 is a flowchart illustrating a process of performing initialization authentication on a micro application client according to an embodiment of the present disclosure. As shown in FIG. 5, the master application client may transmit the Token to the micro application client, and the micro application client may transmit the second application authentication request carrying the Token and the micro appid to the micro application management platform. In a case where the legality of the Token and the micro appid is successfully authenticated, the micro application management platform may return successful authentication information to the micro application client. And in a case where the legality of the Token and the micro appid is unsuccessfully authenticated, the micro application management platform may return an error code to the micro application client.

After the processes of performing initialization authentication on the master application client and the micro application client are implemented through the above procedures, the subsequent process of operating and connecting user systems may be continuously performed.

In some embodiments, in response to receiving the identity authentication request from the master application client and the identity token carried in the identity authentication request being authenticated, the application management terminal transmits the first user identifier corresponding to the user information carried in the identity authentication request to the master application client, which may be implemented in the following manners:

in response to receiving the identity authentication request from the master application client, authenticating the identity token based on the signature information in the identity token; in response to determining that the signature information is authenticated, acquiring the first user identifier based on the user information carried in the identity authentication request; and transmitting the first user identifier to the master application client.

It should be noted that the subsequent process of operating and connecting user systems may be implemented based on the interaction between the micro application management platform and the master index platform.

In a possible implementation manner, on the premise that initialization authentication is successful, the master application client may transmit the identity authentication request carrying the identity token and the user information to the master index platform. The master index platform requests the micro application management platform to authenticate the legality of the master application client. The micro application management platform returns a result of authenticating the legality of the master application client to the master index platform. After the legality of the master application client is successfully authenticated, the master index platform queries the first user identifier (i.e., globalId) registered in the master application client by the target user corresponding to the user information carried in the identity authentication request. After acquiring the first user identifier, the master application client transmits the first user identifier to the micro application client. The micro application client transmits the identifier acquisition request carrying the first user identifier and the identity token of the master application client to the master index platform. After receiving the identity token and the first user identifier, the master index platform requests the micro application management platform to authenticate the legality of the identity token. The micro application management platform returns a result of authenticating the legality of the identity token to the master index platform. In a case where the legality of the identity token is successfully authenticated, the master index platform returns the second user identifier registered in the micro application client by the target user to the micro application client. Now, the first user identifier registered in the master application client by the target user and the second user identifier registered in the micro application client by the target user may be acquired based on the same user information. Further, user information and user data of the target user in the master application client may be acquired based on the first user identifier, and user information and user data of the target user in the micro application client may be acquired based on the second user identifier. The user systems of the master application and the micro application are connected through the master index platform and the micro application management platform, and the master application and the micro application can share user information and user data.

Figure 6:
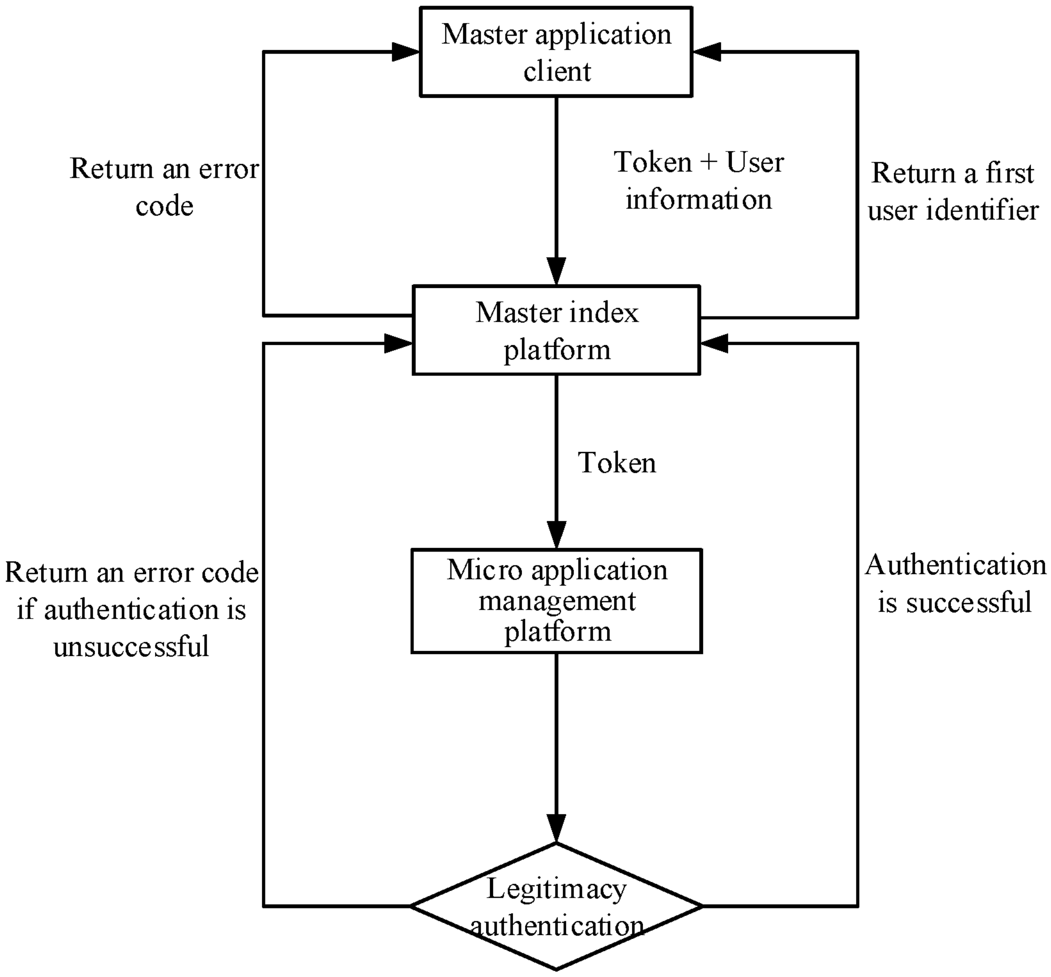
FIG. 6 is a flowchart illustrating a process of acquiring a first user identifier according to an embodiment of the present disclosure.

FIG. 6 is a flowchart illustrating a process of acquiring a first user identifier according to an embodiment of the present disclosure. As shown in FIG. 6, the master application client transmits the identity authentication request carrying the Token and the user information to the master index platform, and the master index platform transmits the Token to the micro application management platform. The micro application management platform authenticates the legality of the Token. In response to determining that the legality of the Token is successfully authenticated, the micro application management platform returns successful authentication information to the master index platform. In response to receiving the successful authentication information, the master index platform may return the first user identifier to the master application client. However, in response to determining that the legality of the Token is unsuccessfully authenticated, the micro application management platform returns the error code to the master index platform. In response to receiving the error code, the master index platform may return the error code to the master application client.

Figure 7:
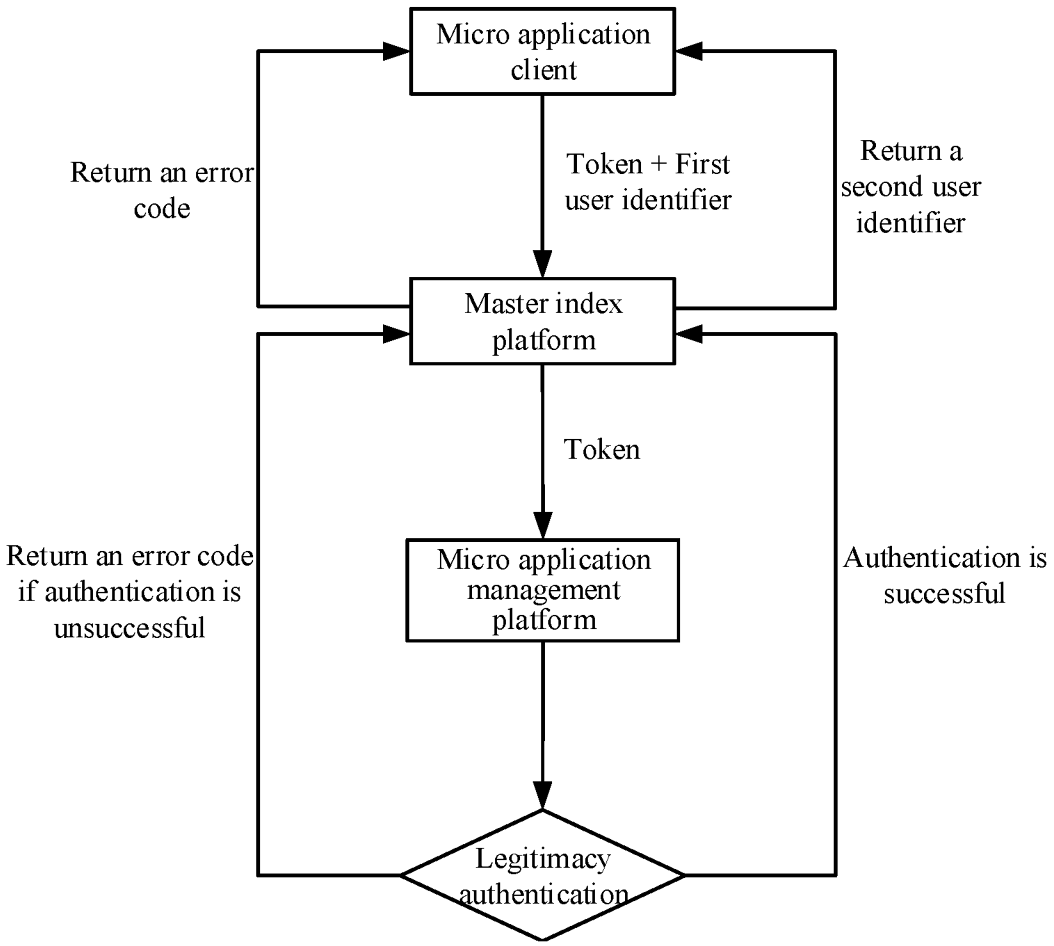
FIG. 7 is a flowchart illustrating a process of acquiring a second user identifier according to an embodiment of the present disclosure.

FIG. 7 is a flowchart illustrating a process of acquiring a second user identifier according to an embodiment of the present disclosure. As shown in FIG. 7, the micro application client transmits the identifier acquisition request carrying the Token and the first user identifier to the master index platform, and the master index platform transmits the Token to the micro application management platform. The micro application management platform authenticates the legality of the Token. In response to determining that the legality of the Token is successfully authenticated, the micro application management platform returns successful authentication information to the master index platform. In response to receiving the successful authentication information, the master index platform may return the second user identifier to the micro application client. However, in response to determining that the legality of the Token is unsuccessfully authenticated, the micro application management platform returns the error code to the master index platform. In response to receiving the error code, the master index platform may return the error code to the micro application client.

Corresponding to the embodiments of methods, the present disclosure further provides embodiments of corresponding identifier acquisition apparatuses and their applied computing devices.

Figure 8:
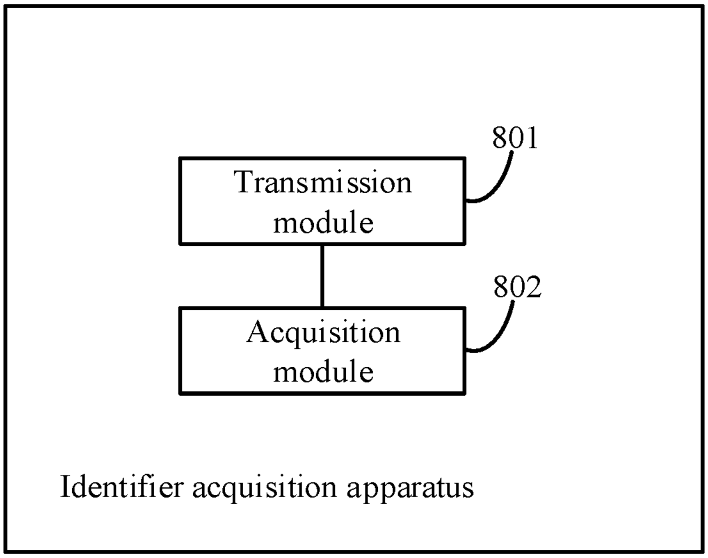
FIG. 8 is a block diagram illustrating an identifier acquisition apparatus according to an embodiment of the present disclosure.

FIG. 8 is a block diagram illustrating an identifier acquisition apparatus according to an embodiment of the present disclosure. The identifier acquisition apparatus is applied to an application management terminal, and includes:

a transmission module 801, configured to, in response to receiving an identity authentication request from a master application client and an identity token carried in the identity authentication request being authenticated, transmit a first user identifier corresponding to user information carried in the identity authentication request to the master application client, where the first user identifier indicates a user identifier registered in the master application client by a target user corresponding to the user information, the master application client is configured to transmit the first user identifier and the identity token to a micro application client in response to receiving the first user identifier, and the micro application client is configured to transmit an identifier acquisition request to the application management terminal based on the first user identifier and the identity token;

an acquisition module 802, configured to, in response to receiving the identifier acquisition request from the micro application client and the identity token carried in the identifier acquisition request being authenticated, acquire a second user identifier corresponding to the first user identifier carried in the identifier acquisition request, where the second user identifier indicates a user identifier registered in the micro application client by the target user;

where the transmission module 801 is further configured to transmit the second user identifier to the micro application client.

In some embodiments, the identity token includes at least signature information;

when, in response to receiving the identity authentication request from the master application client and the identity token carried in the identity authentication request being authenticated, transmitting the first user identifier corresponding to the user information carried in the identity authentication request to the master application client, the transmission module 801 is configured to:

in response to receiving the identity authentication request from the master application client, authenticate the identity token based on the signature information in the identity token;

in response to determining that the signature information is authenticated, acquire the first user identifier based on the user information carried in the identity authentication request;

transmit the first user identifier to the master application client.

In some embodiments, the apparatus further includes:

a generation module, configured to, in response to receiving an application registration request from the master application client, generate a master application identifier and a master application secret key for the master application client, where the generation module is further configured to, in response to receiving an application registration request from the micro application client, generate a micro application identifier and a micro application secret key for the micro application client.

In some embodiments, the apparatus further includes:

an authentication module, configured to, in response to receiving a first application authentication request from the master application client, authenticate legality of the master application client based on the master application identifier and the master application secret key carried in the first application authentication request;

the transmission module 801 is further configured to, in response to determining that the legality of the master application client is authenticated, transmit the identity token to the master application client, and in response to determining that the legality of the master application client is not authenticated, transmit prompt information to the master application client, where the prompt information is configured to prompt that the legality of the master application client is not authenticated.

In some embodiments, the authentication module is further configured to, in response to receiving a second application authentication request from the micro application client, authenticate permission for the master application client to use the micro application client based on the micro application identifier, the micro application secret key, the master application identifier, and the identity token carried in the second application authentication request;

the transmission module 801 is further configured to, in response to determining that the master application client has the permission to use the micro application client, transmit information indicating that the use is allowed to the micro application client, and in response to determining that the master application client does not have the permission to use the micro application client, transmit information indicating that the use is prohibited to the micro application client.

In some embodiments, the apparatus further includes:

a setting module, configured to, in response to receiving a permission acquisition request from the master application client, set permission information for the master application client to have the permission to use the micro application client.

Figure 9:
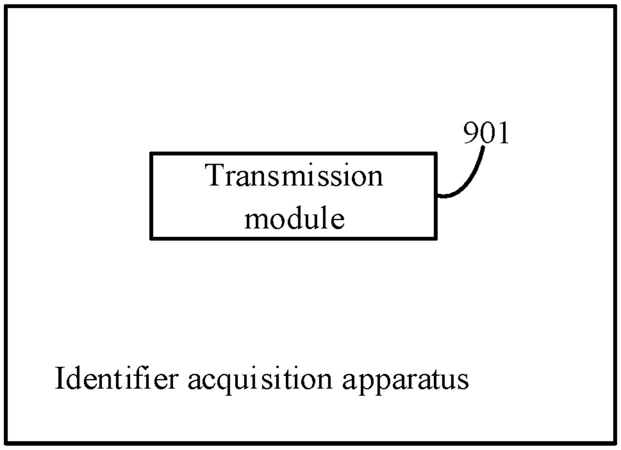
FIG. 9 is a block diagram illustrating an identifier acquisition apparatus according to an embodiment of the present disclosure.

FIG. 9 is a block diagram illustrating an identifier acquisition apparatus according to an embodiment of the present disclosure. The identifier acquisition apparatus is applied to a master application client, and includes:

a transmission module 901, configured to transmit an identity authentication request to an application management terminal, where the identity authentication request carries an identity token and user information, the application management terminal is configured to acquire a first user identifier corresponding to the user information in response to determining that the identity token is authenticated, and the first user identifier indicates a user identifier registered in the master application client by a target user corresponding to the user information;

where the transmission module 901 is further configured to, in response to receiving the first user identifier, transmit the first user identifier to a micro application client, where the micro application client is configured to transmit an identifier acquisition request carrying the identity token and the first user identifier to the application management terminal in response to receiving the first user identifier, and the identifier acquisition request is configured to acquire a user identifier registered in the micro application client by the target user.

In some embodiments, the transmission module 901 is further configured to transmit an application registration request to the application management terminal, where the application management terminal is configured to generate a master application identifier and a master application secret key for the master application client in response to the application registration request;

the apparatus further includes:

a reception module, configured to receive the master application identifier and the master application secret key returned from the application management terminal.

In some embodiments, the transmission module 901 is further configured to transmit a first application authentication request to the application management terminal, where the first application authentication request carries a master application identifier and a master application secret key, and the application management terminal is configured to authenticate legality of the master application client based on the master application identifier and the master application secret key, and transmit the identity token to the master application client in response to determining that the legality of the master application client is authenticated.

In some embodiments, the transmission module 901 is further configured to, in response to receiving the identity token, transmit the master application identifier and the identity token to the micro application client, where the micro application client is configured to transmit a second application authentication request carrying a micro application identifier, a micro application secret key, the master application identifier, and the identity token to the application management terminal, and the application management terminal is configured to authenticate permission for the master application client to use the micro application client based on the micro application identifier, the micro application secret key, the master application identifier, and the identity token, and return an authentication result to the micro application client.

In some embodiments, the transmission module 901 is further configured to transmit a permission acquisition request to the application management terminal, where the application management terminal is configured to set permission information for the master application client to have permission to use the micro application client in response to the permission acquisition request.

Figure 10:
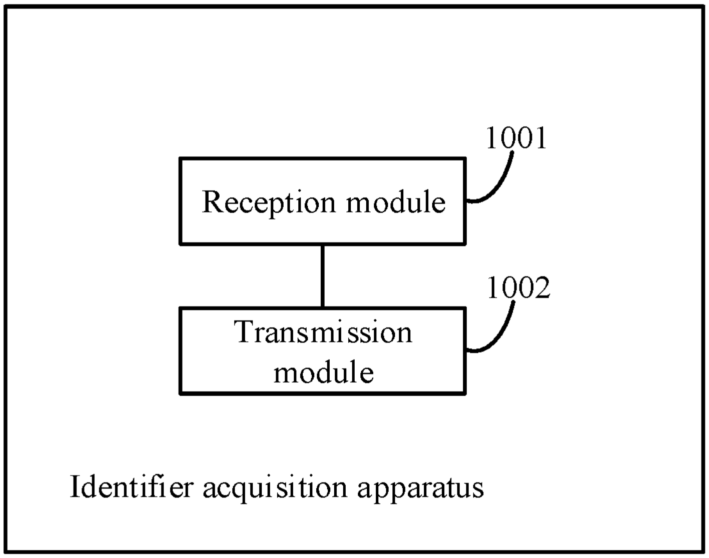
FIG. 10 is a block diagram illustrating an identifier acquisition apparatus according to an embodiment of the present disclosure.

FIG. 10 is a block diagram illustrating an identifier acquisition apparatus according to an embodiment of the present disclosure. The identifier acquisition apparatus is applied to a micro application client, and includes:

a reception module 1001, configured to receive a first user identifier transmitted from a master application client, where the first user identifier indicates a user identifier registered in the master application client by a target user corresponding to user information;

a transmission module 1002, configured to transmit an identifier acquisition request carrying an identity token and the first user identifier to an application management terminal, where the identifier acquisition request is configured to acquire a second user identifier registered in the micro application client by the target user;

where the reception module 1001 is further configured to receive the second user identifier transmitted from the application management terminal.

In some embodiments, the transmission module 1002 is further configured to transmit an application registration request to the application management terminal, where the application management terminal is configured to generate a micro application identifier and a micro application secret key for the micro application client in response to the application registration request;

the reception module 1001 is further configured to receive the micro application identifier and the micro application secret key returned from the application management terminal.

In some embodiments, the transmission module 1002 is further configured to, in response to receiving a master application identifier and the identity token from the master application client, transmit a second application authentication request to the application management terminal, where the second application authentication request carries the micro application identifier, the micro application secret key, the master application identifier, and the identity token, and the application management terminal is configured to authenticate permission for the master application client to use the micro application client based on the micro application identifier, the micro application secret key, the master application identifier, and the identity token, and return an authentication result to the micro application client.

For detailed implementation processes of functions and roles of respective modules in the apparatus, reference may be made to implementation processes of corresponding steps in the method, which will not be repeated here.

For the apparatus embodiments, since they basically correspond to the method embodiments, reference may be made to the partial description of the method embodiments. The apparatus embodiments described above are merely illustrative, where the modules described as separate components may or may not be physically separated, and the components illustrated as modules may or may not be physical modules, i.e., may be located in one place or may be distributed to multiple network modules. Some or all of the modules may be selected according to actual needs to achieve the objectives of the present specification. Those of ordinary skill in the art can understand and implement the present disclosure without any creative effort.

Figure 11:
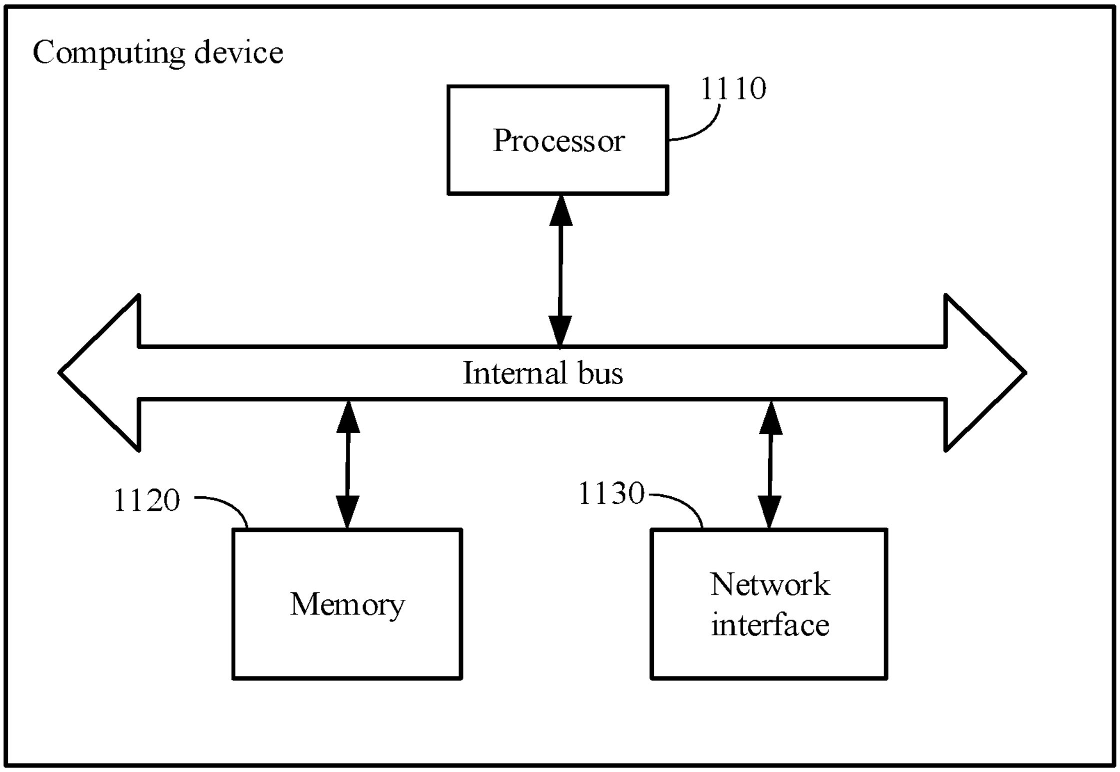
FIG. 11 is a structural schematic diagram illustrating a computing device according to an embodiment of the present disclosure.

The present disclosure further provides a computing device. FIG. 11 is a structural schematic diagram illustrating a computing device according to an embodiment of the present disclosure. The application management platform may run on the computing device, and the computing device may be a server, multiple servers, a server cluster, etc. As shown in FIG. 11, the computing device includes a processor 1110, a memory 1120, and a network interface 1130. The memory 1120 is configured to store computer instructions that can run on the processor 1110. The processor 1110 is configured to implement the identifier acquisition method provided in any one of the embodiments of the present disclosure when executing the computer instructions. The network interface 1130 is configured to implement input and output functions. In more possible implementation manners, the computing device may further include other hardware, which is not limited in the present disclosure.

Figure 12:
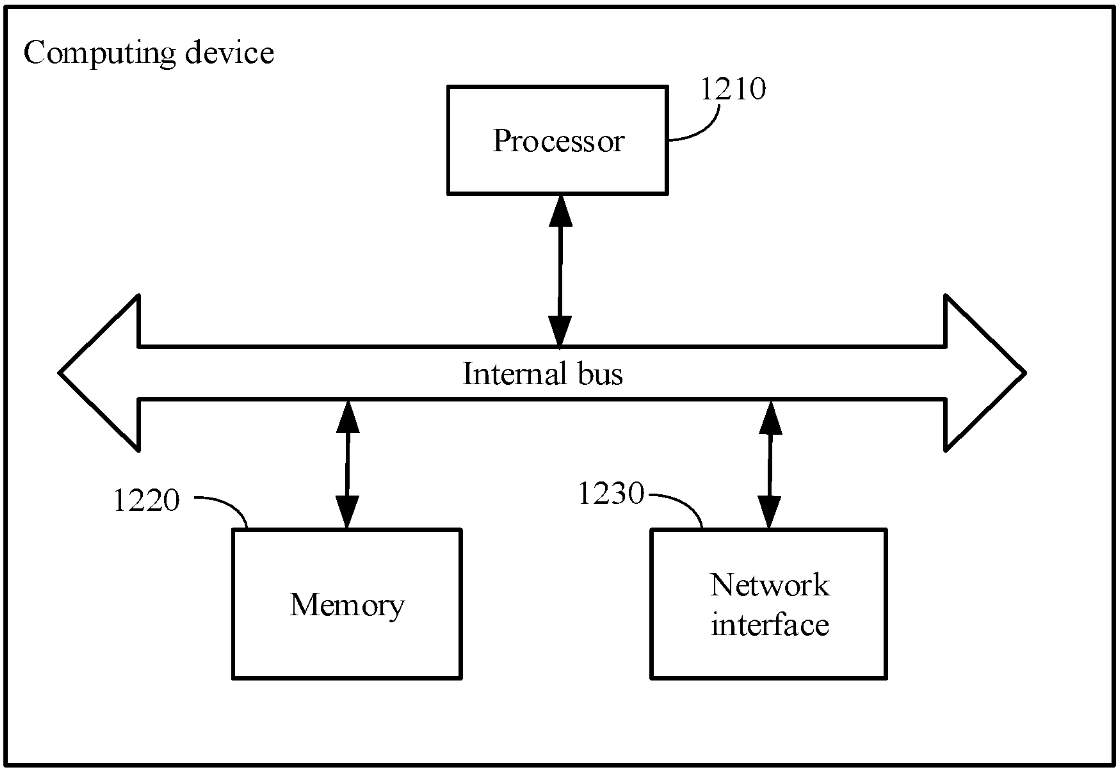
FIG. 12 is a structural schematic diagram illustrating a computing device according to an embodiment of the present disclosure.

The present disclosure further provides a computing device. FIG. 12 is a structural schematic diagram illustrating a computing device according to an embodiment of the present disclosure. The master application client and the micro application client may run on the computing device, and the computing device may be a desktop computer, a portable computer, a notebook computer, a smartphone, a tablet computer, etc. As shown in FIG. 12, the computing device includes a processor 1210, a memory 1220, and a network interface 1230. The memory 1220 is configured to store computer instructions that can run on the processor 1210. The processor 1210 is configured to implement the identifier acquisition method provided in any one of the embodiments of the present disclosure when executing the computer instructions. The network interface 1230 is configured to implement input and output functions. In more possible implementation manners, the computing device may further include other hardware, which is not limited in the present disclosure.

The present disclosure further provides a computer readable storage medium, which may be in various forms. For example, in different examples, the computer readable storage medium may be: a Random Access Memory (RAM), a volatile memory, a non-volatile memory, a flash memory, a storage drive (such as a hard disk drive), a solid state hard disk, any type of storage disk (such as an optical disk or a DVD), or a similar storage medium, or a combination thereof. In particular, the computer readable medium can be paper or other suitable medium capable of printing programs. A computer program is stored on the computer readable storage medium, and when the computer program is executed by the processor shown in FIG. 11 or 12 to implement the identifier acquisition method provided in any one of the embodiments of the present disclosure.

The present disclosure further provides a computer program product, including a computer program, where the computer program is executed by the processor shown in FIG. 11 or 12 to implement the identifier acquisition method provided in any one of the embodiments of the present disclosure.

Those skilled in the art should understand that one or more embodiments of the present specification may be provided as methods, apparatuses, computing devices, computer readable storage media, or computer program products. Accordingly, one or more embodiments of the present specification may take the form of pure hardware embodiments, pure software embodiments, or embodiments combining software and hardware aspects. Furthermore, one or more embodiments of the present specification may take the form of computer program products implemented on one or more computer usable storage media (including, but not limited to, disk storage, Compact Disc Read-Only Memories (CD-ROMs), optical storage, etc.) having computer usable program codes therein.

Various examples in the present specification are described in a progressive manner. Same or similar parts in the various examples may be referred to for each other, and each example focuses on the differences from other examples. Especially, for the examples corresponding to the computing devices, since they are basically similar to the method examples, the description is simplified, and reference may be made to some of the description of the method examples.

Specific embodiments of the present specification are described above. Other embodiments are within the scope of the present disclosure. In some cases, actions or steps recorded in the present disclosure can be performed in a sequence different from that in the embodiments and desired results can still be achieved. In addition, processes depicted in the drawings are not necessarily required to be performed in a shown particular or sequential order to achieve the desired results. In some embodiments, multi-task processing and parallel processing are possible or may be advantageous.

The embodiments of subject matters and functional operations described in the present specification can be implemented in a digital electronic circuit, tangible computer software or firmware, computer hardware including structures and their structural equivalents disclosed in this specification, or a combination of one or more of them. The embodiments of the subject matters described in the present specification can be implemented as one or more computer programs, that is, one or more modules in computer program instructions that are encoded on a tangible non-temporary program carrier so as to be executed by the identifier acquisition apparatus or that control operations of the identifier acquisition apparatus. Alternatively or additionally, program instructions can be encoded on artificially generated propagation signals, such as machine generated electrical, optical, or electromagnetic signals, which are generated to encode and transmit information to a suitable receiver apparatus for execution by the identifier acquisition apparatus. The computer storage medium can be a machine readable storage device, a machine readable storage substrate, a random or serial access memory device, or a combination of one or more of them.

The processes and logic steps described in the present specification can be executed by one or more programmable computers that execute one or more computer programs, so as to realize corresponding functions by operating according to input data and generating outputs. The processes and logic steps can be executed by a special logic circuit, such as Field Programmable Gate Array (FPGA) or Application Specific Integrated Circuit (ASIC), and the apparatus can be implemented as a special logic circuit.

Computers suitable for executing computer programs include, for example, general-purpose and/or dedicated microprocessors, or any other type of central processing unit. Typically, the central processing unit may receive instructions and data from ROM and/or RAM. Basic components of a computer include a central processing unit for implementing or executing instructions and one or more memory devices for storing instructions and data. In general, the computer may further include one or more mass storage devices for storing data, such as a magnetic disk, a magneto-optical disk or an optical disk, or the computer may be operatively coupled with the mass storage devices to receive or transmit data therefrom or thereto, or both. However, the computer does not have to include such devices. In addition, the computer may be embedded in another device, such as a mobile phone, a Personal Digital Assistant (PDA), a mobile audio or video player, a game console, a Global Positioning System (GPS) receiver, or a portable storage device (for example, a Universal Serial Bus (USB) flash drive), to name just a few.

Computer readable media suitable for storing computer program instructions and data include all forms of non-volatile memory, medium, and memory device, such as semiconductor memory devices (such as EPROMS, EEPROMs, and flash memory devices), magnetic disks (such as internal hard disks or removable disks), magneto-optical disks, and CD-ROM and DVD-ROM disks. The processor and the memory may be supplemented by or incorporated into a special logic circuit.

Although the present specification includes many specific implementation details, these, instead of being interpreted as limiting the scope of any invention or the claimed scope of protection, are mainly used to describe characteristics of specific embodiments of a particular invention. Some features described in multiple embodiments of the present specification may be combined in a single embodiment. In another aspect, various features described in a single embodiment may be implemented separately in multiple embodiments or implemented in any suitable sub-combination. In addition, although features may take effect in some combinations as described above and be even initially so claimed, one or more features from the claimed combinations may be removed from the combinations in some cases, and the claimed combinations may point to sub-combinations or variants of the sub-combinations.

Similarly, although the operations are described in the drawings in a specific order, this should not be understood as requiring these operations to be performed in a shown particular or sequential order, or requiring all illustrated operations to be performed, so as to achieve desired results. In some cases, multi-task processing and parallel processing may be advantageous. In addition, separation of various system modules and components in the embodiments as described above should not be understood as that such separation is required in all embodiments, and it should be understood that the described program components and system can be generally integrated into a single software product or packaged into multiple software products.

Therefore, the specific embodiments of the subject matters have been described. Other embodiments are within the scope of the present disclosure. In some cases, actions described in the present disclosure may be performed in different orders and the desired results can still be achieved. Further, the processes depicted in the drawings are not necessarily required to be performed in a shown particular or sequential order to achieve the desired results. In some implementations, multi-task processing and parallel processing may be advantageous.

Other embodiments of the present specification will be readily apparent to those skilled in the art after considering the specification and practicing the contents disclosed herein. The present specification is intended to cover any variations, uses, or adaptations of the present specification, which follow the general principle of the present specification and include common knowledge or conventional technical means in the art that are not disclosed in the present specification. That is, the present specification is not limited to the precise structures that have been described and shown in the drawings, and various modifications and changes can be made without departing from the scope thereof.

The above are only optional embodiments of the present specification, which are not intended to limit the specification. Any modification, equivalent replacement, improvement, etc. made within the spirit and principle of the specification shall be included in the protection scope of the specification.

The invention claimed is:

1. A method, comprising:

in response to receiving an identity authentication request from a master application client and an identity token carried in the identity authentication request being authenticated, transmitting a first user identifier corresponding to user information carried in the identity authentication request to the master application client, wherein the first user identifier indicates a user identifier registered in the master application client by a target user corresponding to the user information, the master application client is configured to transmit the first user identifier and the identity token to a micro application client in response to receiving the first user identifier, and the micro application client is configured to transmit an identifier acquisition request carrying the identity token and the first user identifier to an application management terminal in response to receiving the first user identifier and the identity token;

in response to receiving the identifier acquisition request carrying the identity token and the first user identifier from the micro application client and the identity token carried in the identifier acquisition request being authenticated, acquiring a second user identifier corresponding to the first user identifier carried in the identifier acquisition request, wherein the second user identifier indicates a user identifier registered in the micro application client by the target user; and transmitting the second user identifier to the micro application client.

2. The method according to claim 1, wherein the identity token comprises signature information;

wherein transmitting the first user identifier corresponding to the user information carried in the identity authentication request to the master application client comprises:

in response to receiving the identity authentication request from the master application client, authenticating the identity token based on the signature information in the identity token;

in response to determining that the signature information being authenticated, acquiring the first user identifier based on the user information carried in the identity authentication request; and transmitting the first user identifier to the master application client.

3. The method according to claim 1, wherein, before transmitting the first user identifier corresponding to the user information carried in the identity authentication request to the master application client, the method further comprises:

in response to receiving an application registration request from the master application client, generating a master application identifier and a master application secret key for the master application client, and transmitting the master application identifier and the master application secret key to the master application client; or in response to receiving an application registration request from the micro application client, generating a micro application identifier and a micro application secret key for the micro application client, and transmitting the micro application identifier and the micro application secret key to the micro application client; or both.

4. The method according to claim 3, wherein, before transmitting the first user identifier corresponding to the user information carried in the identity authentication request to the master application client, the method further comprises:

in response to receiving a first application authentication request from the master application client, authenticating legality of the master application client based on the master application identifier and the master application secret key carried in the first application authentication request; and in response to determining that the legality of the master application client is authenticated, transmitting the identity token to the master application client, and in response to determining that the legality of the master application client is not authenticated, transmitting prompt information to the master application client, wherein the prompt information is configured to prompt that the legality of the master application client is not authenticated.

5. The method according to claim 4, wherein, after transmitting the identity token to the master application client, the method further comprises:

in response to receiving a second application authentication request from the micro application client, authenticating permission for the master application client to use the micro application client based on the micro application identifier, the micro application secret key, the master application identifier, and the identity token carried in the second application authentication request; and in response to determining that the master application client has the permission to use the micro application client, transmitting information indicating that the use is allowed to the micro application client, and in response to determining that the master application client does not have the permission to use the micro application client, transmitting information indicating that the use is prohibited to the micro application client.

6. The method according to claim 5, wherein, before authenticating the permission for the master application client to use the micro application client, the method further comprises:

in response to receiving a permission acquisition request from the master application client, setting permission information for the master application client to have the permission to use the micro application client.

7. A method comprising:

transmitting an identity authentication request to an application management terminal, wherein the identity authentication request carries an identity token and user information, the application management terminal is configured to acquire a first user identifier corresponding to the user information in response to determining that the identity token is authenticated, and the first user identifier indicates a user identifier registered in a master application client by a target user corresponding to the user information;

in response to receiving the first user identifier, transmitting the first user identifier and the identity token to a micro application client, wherein the micro application client is configured to transmit an identifier acquisition request carrying the identity token and the first user identifier to the application management terminal in response to receiving the first user identifier and the identity token, and the identifier acquisition request is configured to acquire a second user identifier registered in the micro application client by the target user, and wherein the application management terminal is configured to in response to receiving the identifier acquisition request carrying the identity token and the first user identifier from the micro application client and the identity token carried in the identifier acquisition request being authenticated, acquire the second user identifier corresponding to the first user identifier carried in the identifier acquisition request, and transmit the second user identifier to the micro application client.

8. The method according to claim 7, wherein, before transmitting the identity authentication request to the application management terminal, the method further comprises:

transmitting an application registration request to the application management terminal, wherein the application management terminal is configured to generate a master application identifier and a master application secret key for the master application client in response to the application registration request; and receiving the master application identifier and the master application secret key returned from the application management terminal.

9. The method according to claim 7, wherein, before transmitting the identity authentication request to the application management terminal, the method further comprises:

transmitting a first application authentication request to the application management terminal, wherein the first application authentication request carries a master application identifier and a master application secret key, and the application management terminal is configured to authenticate legality of the master application client based on the master application identifier and the master application secret key, and transmit the identity token to the master application client in response to determining that the legality of the master application client is successfully authenticated.

10. The method according to claim 9, wherein, after transmitting the first application authentication request to the application management terminal, the method further comprises:

in response to receiving the identity token, transmitting the master application identifier and the identity token to the micro application client, wherein the micro application client is configured to transmit a second application authentication request carrying a micro application identifier, a micro application secret key, the master application identifier, and the identity token to the application management terminal; and the application management terminal is configured to authenticate permission for the master application client to use the micro application client based on the micro application identifier, the micro application secret key, the master application identifier, and the identity token, and return an authentication result to the micro application client.

11. The method according to claim 7, wherein, before transmitting the identity authentication request to the application management terminal, the method further comprises:

transmitting a permission acquisition request to the application management terminal, wherein the application management terminal is configured to set permission information for the master application client to have permission to use the micro application client in response to the permission acquisition request.

12. A method comprising:

receiving a first user identifier and an identity token transmitted from a master application client, wherein the first user identifier indicates a user identifier registered in the master application client by a target user, and wherein the first user identifier and the identity token are transmitted by the master application client in response to receiving the first user identifier from an application management terminal;

transmitting an identifier acquisition request carrying the identity token and the first user identifier to the application management terminal, wherein the identifier acquisition request is configured to acquire a second user identifier registered in a micro application client by the target user, and wherein the application management terminal is configured to in response to receiving the identifier acquisition request carrying the identity token and the first user identifier from the micro application client and the identity token carried in the identifier acquisition request being authenticated, acquire the second user identifier corresponding to the first user identifier carried in the identifier acquisition request; and receiving the second user identifier transmitted from the application management terminal.

13. The method according to claim 12, wherein, before receiving the first user identifier transmitted from the master application client, the method further comprises:

transmitting an application registration request to the application management terminal, wherein the application management terminal is configured to generate a micro application identifier and a micro application secret key for the micro application client in response to the application registration request; and receiving the micro application identifier and the micro application secret key returned from the application management terminal.

14. The method according to claim 13, wherein, before receiving the first user identifier transmitted from the master application client, the method further comprises:

in response to receiving a master application identifier and the identity token from the master application client, transmitting a second application authentication request to the application management terminal, wherein the second application authentication request carries the micro application identifier, the micro application secret key, the master application identifier, and the identity token, and the application management terminal is configured to authenticate permission for the master application client to use the micro application client based on the micro application identifier, the micro application secret key, the master application identifier, and the identity token, and return an authentication result to the micro application client.

15. A computing device, comprising: a memory, a processor, and a computer program stored in the memory and runnable on the processor, wherein the program is executed by the processor to implement the identifier acquisition method according to claim 1.

16. A non-transitory computer readable storage medium having a program stored thereon, wherein the program is executed by a processor to implement the identifier acquisition method according to claim 1.

17. A computing device, comprising: a memory, a processor, and a computer program stored in the memory and runnable on the processor, wherein the program is executed by the processor to implement the identifier acquisition method according to claim 7.

18. A computing device, comprising: a memory, a processor, and a computer program stored in the memory and runnable on the processor, wherein the program is executed by the processor to implement the identifier acquisition method according to claim 12.

19. A non-transitory computer readable storage medium having a program stored thereon, wherein the program is executed by a processor to implement the identifier acquisition method according to claim 7.

20. A non-transitory computer readable storage medium having a program stored thereon, wherein the program is executed by a processor to implement the identifier acquisition method according to claim 12.

* * * * *